US012763076B2

(12) United States Patent
(10) Patent No.: US 12,763,076 B2
(45) Date of Patent: Oct. 13, 2026

Starling et al.

(54) TELEPHONY CALL CONFIGURATION AGENT

(71) Applicant: MICROSOFT TECHNOLOGY LICENSING, LLC, Redmond, WA (US)

(72) Inventors: Robert John Starling, San Francisco, CA (US); Thomas David Price, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 225 days.

(21) Appl. No.: 18/799,211

(22) Filed: Aug. 9, 2024

(65) Prior Publication Data

US 2025/0372091 A1 Dec. 4, 2025

Related U.S. Application Data

(60) Provisional application No. 63/655,443, filed on Jun. 3, 2024.

(51) Int. Cl.
*G10L 15/22* (2006.01)
*G10L 15/26* (2006.01)

(52) U.S. Cl.
CPC .............. *G10L 15/22* (2013.01); *G10L 15/26* (2013.01)

(58) Field of Classification Search
CPC ........ G10L 15/22; G10L 15/26; H04M 3/493; H04M 3/527; H04M 2203/355; H04M 3/5166; H04L 51/02
See application file for complete search history.

(56) References Cited

U.S. PATENT DOCUMENTS

| | | | | |
|---|---|---|---|---|
| 2020/0243062 | A1* | 7/2020 | Scodary | G10L 13/02 |
| 2022/0255885 | A1* | 8/2022 | Aharoni | G06N 3/09 |
| 2024/0267344 | A1* | 8/2024 | Mulligan | H04L 51/02 |
| 2025/0028743 | A1* | 1/2025 | Massoudian | G06F 16/3329 |
| 2025/0284963 | A1* | 9/2025 | Abhyankar | G06N 20/00 |
| 2025/0328556 | A1* | 10/2025 | Twohig | G06F 16/3329 |
| 2025/0355946 | A1* | 11/2025 | Price | G06F 16/90332 |

* cited by examiner

*Primary Examiner* — Mark Villena

(74) *Attorney, Agent, or Firm* — Han Gim; Newport IP, LLC

(57) ABSTRACT

A configuration system receives, from an endpoint node of a communications network, information about a desired bot configuration. The endpoint node and the configuration system are in the communications network. The configuration system sends a request comprising a system prompt and the received information to a generative model. The configuration system receives a response to the request, the response comprising a plurality of further system prompts for implementing the desired bot configuration. For each of the plurality of further system prompts, the configuration system triggers instantiation of a bot at a node of the communications network. The instantiated bot comprises the further system prompt. The configuration system sends configuration to a voice interface, to configure the voice interface such that a telephony call associated with the endpoint node has at least one of the instantiated bots as a participant on the telephony call.

20 Claims, 8 Drawing Sheets

TELEPHONY CALL CONFIGURATION AGENT

CROSS-REFERENCE TO RELATED APPLICATION

This application claims the benefit of U.S. provisional application No. 63/655,443 filed on Jun. 3, 2024, entitled "Telephony call configuration agent" the entirety of which is hereby incorporated by reference herein.

BACKGROUND

Human call center bots handle telephony calls to provide services to end users in a variety of commercial sectors. Call center bot technology is relatively complex as calls have to be routed to bots on the fly without dropping calls. Managing allocation of calls so as to be able to cope with peaks in demand and fluctuations in available communications bandwidth is an ongoing task. Managing allocation of calls to human bots with appropriate expertise is another challenge. Deploying call center bot technology is done by skilled engineers.

Human call center bot technology may be augmented with automated call center bot technology such as chat bots. However, the automated call center technology has to be configured and integrated with the human call center technology which is not straightforward and is done by skilled engineers.

The embodiments described below are not limited to implementations which solve any or all of the disadvantages of known telephony call bot technology.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An automated configuration system is able to automatically trigger instantiation of a plurality of bots for providing a bespoke call center service. In some cases, using only a voice call, an end user is able to have the automated configuration system instantiate a plurality of bots that give a bespoke call center service.

In various examples there is a configuration system comprising a processor and a memory storing a system prompt and instructions that, when executed by the processor, perform a method. The method comprises receiving, from an endpoint node of a communications network, information about a desired bot configuration. The endpoint node and the configuration system are in the communications network. The configuration system sends a request comprising the system prompt and the received information to a generative model. The configuration system receives a response to the request, the response comprising a plurality of further system prompts for implementing the desired bot configuration. For each of the plurality of further system prompts, the configuration system triggers instantiation of a bot at a node of the communications network. The instantiated bot comprises the further system prompt and bot code. The bot code is to send the further system prompt and additional information to the generative model, where the additional information is obtained by the instantiated bot from any of: a transcript of a call, a history of previous call transcripts, information obtained from records associated with the endpoint node. The configuration system sends configuration to a voice interface, to configure the voice interface such that a telephony call associated with the endpoint node has at least one of the instantiated bots as a participant on the telephony call.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
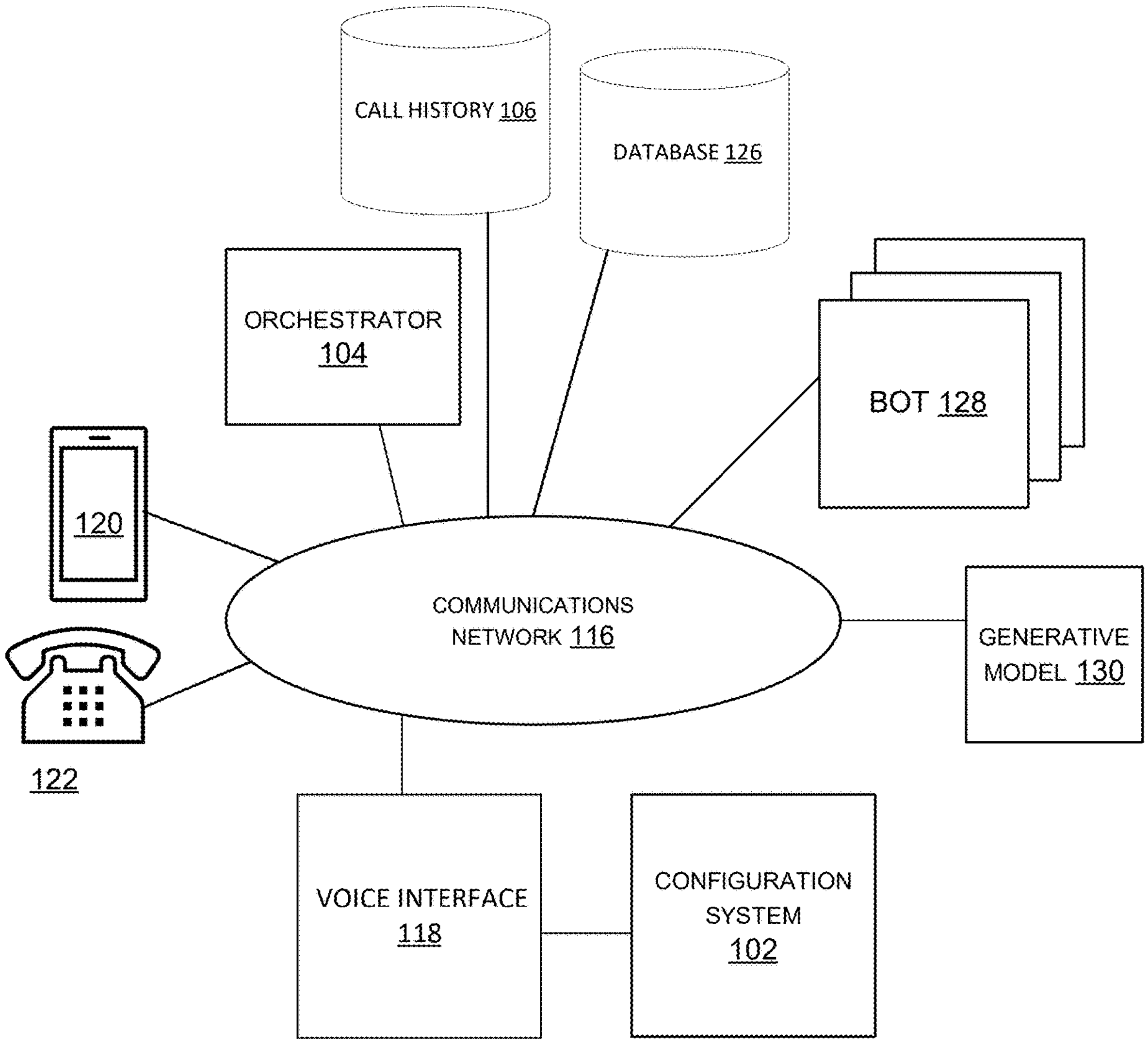
FIG. 1 is a schematic diagram of a configuration system deployed in a communications network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Deploying call center technology for a particular enterprise is time consuming and complex. Routing and switching infrastructure has to be deployed to route calls to the call center and dedicated call allocation functionality has to be configured to allocate calls to particular human bots according to requirements of the particular enterprise. Functionality to place calls on hold while waiting to be allocated to a bot has to be set up and voice or key press options for callers to select to be routed to a desired bot type have to be configured.

Costs to deploy call center technology for an individual enterprise are high and typically prohibitive for sole traders such as hair dressers, plumbers, heating engineers and other sole traders. Small businesses and sole proprietors are typically unable to use call center technology due to the costs and often do not have budget for functions such as receptionists or personal business assistants.

The present technology provides an automated configuration system which is able to automatically instantiate a plurality of bots to provide call centre type services. An end user is able to give information about a desired bot configuration so as to obtain a bespoke call center service. In some cases the end user is able to give the information using only a telephony interface such as a smart phone. By using an automated configuration system an efficient way of deploying a bespoke call center service is given. Using the automated configuration system gives scalability by scaling the number of instantiated bots. The configuration system may be used to change or adapt configuration of already deployed bots in some cases; this is efficient since it is not necessary to decommission existing bots and replace them with newly deployed bots.

In examples, a configuration system (which is computer implemented) receives, from an endpoint node of a communications network, information about a desired bot configuration. The endpoint node may be a smart phone or mobile communications device of a sole trader or enterprise manager. The information about the desired bot configuration may be a transcript of a dialog where a sole trader or enterprise manager explains what the call center functionality should be. In this way an end user is able to give the information about the desired bot configuration in an intuitive way without needing to be an expert on call centre technology deployment.

The configuration system sends a request comprising a system prompt and the received information to a generative model. The system prompt may be available at the configuration system in advance, such as by having been defined by a telco operator or engineer. Sending the request is efficient since the request is formed from only two sources.

The configuration system receives a response to the request, the response comprising a plurality of further system prompts for implementing the desired bot configuration. Using a generative model to form the further system prompts is efficient and effective.

The configuration system, for each of the plurality of further system prompts, triggers instantiation of a bot at a node of the communications network, the instantiated bot comprising the further system prompt and bot code. In this way the process is scalable since the number of instantiated bots can easily be increased or decreased according to demand such as a number of expected calls.

The configuration system sends configuration to a voice interface, to configure the voice interface such that a telephony call associated with the endpoint node has at least one of the instantiated bots as a participant on the telephony call. In this way calls including the endpoint node (such as the sole trader's smart phone) may benefit from services provided by the instantiated bots.

FIG. 1 is a schematic diagram of a configuration system 102 deployed in a communications network 116. The communications network 116 is any communications network that is able to transmit telephony calls such as voice over internet protocol calls. In some cases the communications network 116 comprises a public switched telephone network (PSTN). In some cases the communications network 116 comprises a 5G telephony network.

The communications network 116 comprises a plurality of endpoint nodes such as smart phone 120, desktop telephone handset 122, or other communications network nodes used by end users to make or receive voice calls, and/or video calls.

The communications network comprises a voice interface 118 which comprises voice to text functionality such as Microsoft Azure (trade mark) voice to text services, text to speech services, Otter.ai (trade mark), Alexa (trade mark) speech recognition technology or others. Voice interface 118 comprises machine learning technology such as deep neural network technology using recurrent neural networks or transformer networks. Voice interface 118 comprises a trained neural network, trained to convert between speech and text optionally in more than one human language. Voice interface 118 also comprises a router for routing media signals of calls (after transcription) to bots and/or data stores as described in more detail below.

The configuration system 102 is able to access one or more generative models 130 via communications network 116. Each generative model is a machine learning model such as a neural network which has been trained to generate text and/or speech in response to a prompt. In some examples a generative model has a transformer architecture. In some examples a generative model has more than one billion parameters. A generative model may be a language model. A non-exhaustive list of examples of generative model is: Llama 2, GEMINI, Chat GPT, BLOOM.

The configuration system 102 instantiates a plurality of bots 128 so the plurality of bots may provide a call center service for an enterprise, sole trader, individual or other party. The example of FIG. 1 shows three bots 128 which have been instantiated by configuration system 102, although note that many more bots may be present in practice. The bots 128 have access to data sources via communications network 116 such as call history database 106 and database 126 (which may store context or other data). An orchestrator 104 is optionally present such as where the bots 128 are containerized and an orchestrator 104 is used to instantiate the bots 128.

The configuration system of the disclosure operates in an unconventional manner to achieve efficient, automated and scalable deployment of bots for a call center service.

The configuration system improves the functioning of the underlying communications network by facilitating automated set up of bots providing a desired call center service.

Alternatively, or in addition, the functionality of the configuration system 102 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
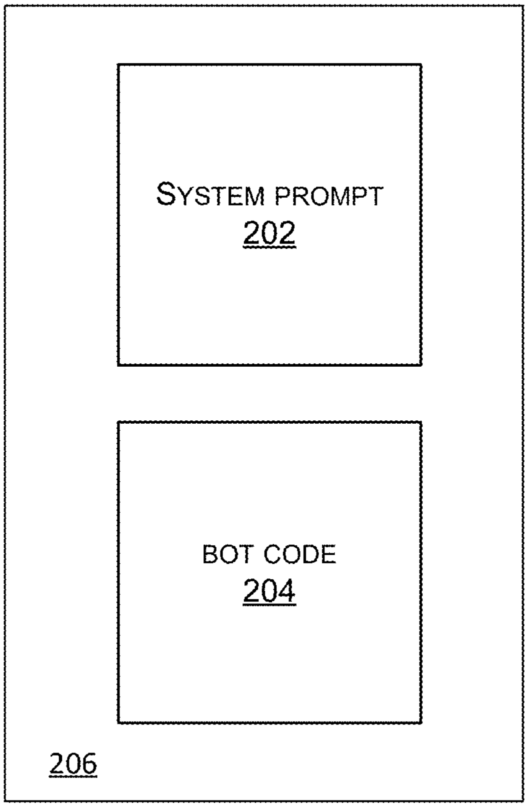
FIG. 2 is a schematic diagram of a bot.
Figure 2A:
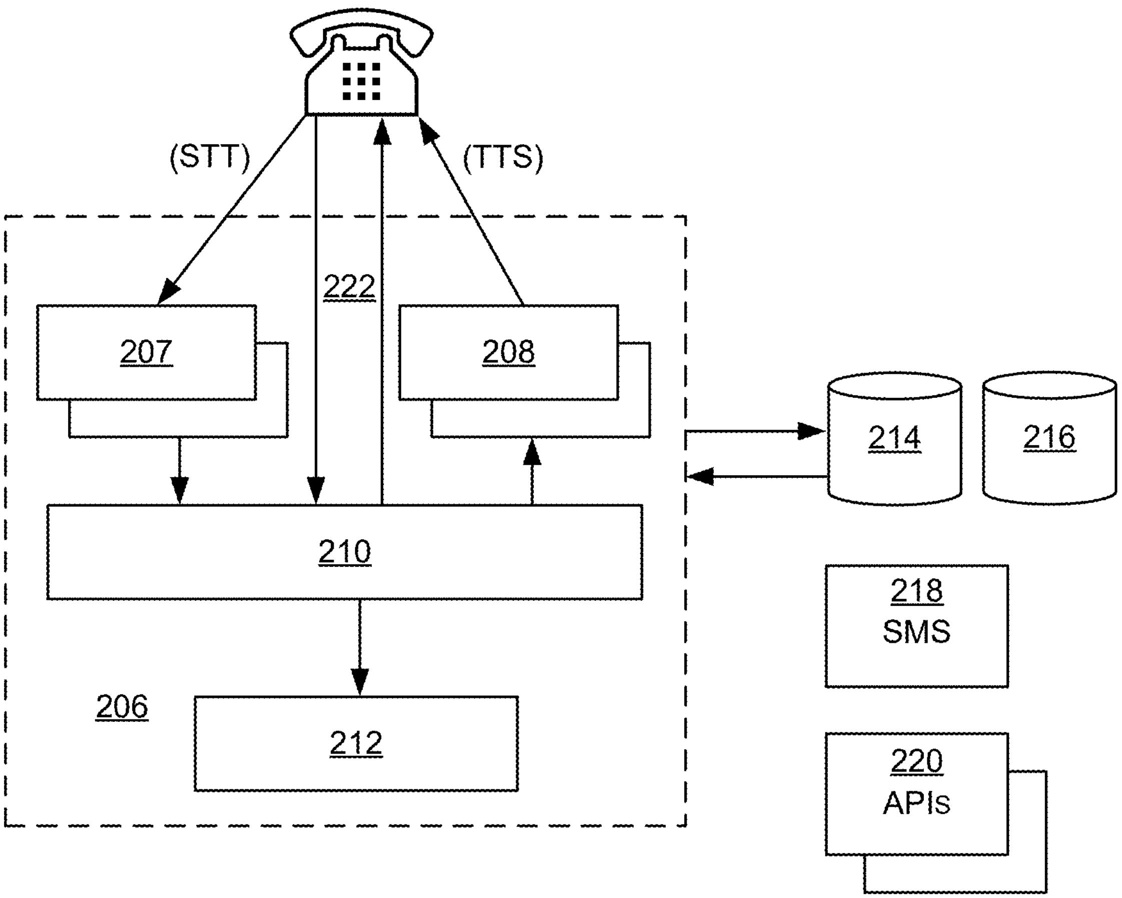
FIG. 2A is a schematic diagram of another bot.

FIG. 2 is a schematic diagram of a bot 206 such as any of the bots 128 of FIG. 1. The bot is computer implemented such as by being an application executing on a virtual machine or other computing entity. In some cases the bot 206 is containerized. The bot 206 comprises a system prompt 202 and bot code 204. A system prompt 202 is an input for a generative model that steers the behavior of the generative model. A system prompt is text comprising instructions on a broad task the generative model is being asked to do. A system prompt comprises instructions about how to answer a user prompt, such as specifying a language to respond in, a style of a response, a length of a response, a format of a response, a role the generative model should adopt when responding to the user prompt. The bot also comprises bot code 204 comprising software for managing sending of prompts to a generative model, forwarding responses returned from a generative model to specified entities, obtaining context to be sent to a generative model together with a system prompt, FIG. 2A shows another example of a bot 206 such as any of the bots 128 of FIG. 1. The bot 206 is computer implemented such as by being an application executing on a virtual machine or other computing entity.

The bot 206 comprises or has access to one or more pre-processing AI models 207. The pre-processing AI models 207 are generative machine learning models in some cases or may be rule based software in some cases. The pre-processing AI models 207 may be generative machine learning models that only take text as input or they may be multimodal models which use the user's native audio/audio-visual stream. FIG. 2A shows speech to text (STT) functionality between an endpoint communication device and the bot 206. FIG. 2A shows text to speech (TTS) functionality between bot 206 and the endpoint communication device. The endpoint communication device may be a cell phone, a desktop communication device or any other endpoint communication device suitable for sending and receiving voice over internet protocol calls.

At least one of the pre-processing AI models 207 comprises a parser to parse the user input. By parsing the user input the user input is made suitable for downstream processing by one or more other processes. In an example, the parsed user input is homogenized by converting it into a specified format. In an example, homogenizing the input comprises converting dates, uniform resource locators (URLs) or telephone numbers to a standard format, or translating to a default language. Homogenizing the input facilitates operation of downstream processes which are format sensitive. In some cases the input is customized by one of the pre-processing AI models 207 such as by replacing telephone numbers with names, or adding/removing common/colloquial terms like "next Wednesday" or "the weekend". Customizing the input facilitates downstream operation on the input.

In some cases one or more of the pre-processing AI models 207 generate and execute custom searches or database queries such as to retrieve calendar information or other data. In an example, a pre-processing AI model 207 retrieves relevant database entries for appointment times corresponding to a requested time period.

In some cases one or more of the pre-processing AI models 207 triggers actions in a communications network of which the bot 206 is part. A non-limiting example of an action which is triggered is an attempt to send an SMS to a supervisor and report the result if the caller is requesting escalation.

In the example of FIG. 2A the bot 206 is shown as containing a primary chat model 210 which is a generative AI model such as GPT 4, BLOOM, LlaMa or any other language model. However, it is not essential for a primary chat model 210 to be within the bot 206 as the primary chat model 210 may be located remotely and in communication with the bot 206 via a communications network. The primary "chat" model 210 uses a system prompt (optionally including additional inputs from the pre-processing AI models 207 and any other dynamically generated content) to generate a response which may be sent to the communications endpoint.

The bot 206 may generate multiple requests (such as a plurality of copies of the same request) to multiple "primary" chat models to improve one or more of: speed, redundancy, accuracy. The "primary" chat models 210 may be text models or multimodal models which use the user's native audio/audio-visual stream (shown by arrows 222).

The bot 206 may comprise one or more post-processing AI models 208. One or more of the post-processing AI models parses the response from the primary chat model 210 and provides supporting functionality such as one or more of the following:

- homogenize the output by converting the output to a specified format, such as by converting dates, uniform resource locators (URLs) or telephone numbers to a standard format, or translating back to the user's language;
- customize the output by replacing specified elements of the output with other specified elements;
- generate and execute custom searches, database queries or updates (e.g. replace placeholder information with retrieved data, or provisionally book an appointment timeslot);
- trigger actions (e.g. send an SMS or trigger function in an external business application or process using external APIs).

The post-processing AI models 208 may be text models or multimodal models (if the output from model 210 is also an audio/audio-visual stream). In an example the post processing AI models 208 are generative AI models.

In some examples the bot 206 may also comprise one or more end-of-call models 212 which perform functionality required at the end of a call, such as one or more of:

- generate call summary and transcripts;
- confirm any provisionally booked appointments;
- send 'end of call' SMS to the caller (call summary, feedback survey etc.)

The bot 206 may have access to one or more data sources 214, 216. The data sources can be queried by the bot code 204 to provide additional input (or dynamic content) for any of the models 207, 208, 210, 212.

The data sources 214, 216 can be updated by the bot code 204 in response to output from any of the primary chat models 210, pre-processing models 207, post processing models 208 or end of call models 212.

The bot 206 may be in communication with an SMS API or gateway 218 such as to enable the post processing models 208 to trigger sending of an SMS message to an end user communications device. The SMS API or gateway 218 may be triggered by output from any of the primary chat models 210, pre-processing models 207, post processing models 208 or end of call models 212.

The bot 206 may be in communication with other APIs 220 which can be triggered by output from any of the primary chat models 210, pre-processing models 207, post processing models 208 or end of call models 212.

Figure 3:
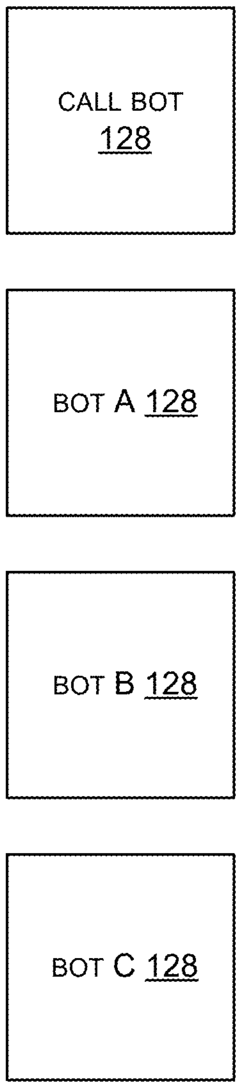
FIG. 3 is a schematic diagram of a plurality of bots instantiated to provide a bespoke call center service.

FIG. 3 is a schematic diagram of a plurality of bots 128 instantiated to provide a bespoke call center service. At least one of the bots 128 is a call bot that participates in a dialog as part of a call with an endpoint node of the communications network. In some cases media packets of the call are processed by the voice interface to produce a transcript that is sent to the call bot. The call bot uses its system prompt and the transcript to prompt a generative model and in return receives a response from the generative model. The response is sent to the voice interface which converts the response from text to speech and injects the speech into the call. A transcript of the call including the dialog may be saved in a store such as call history 106 store.

The other bots, bot A, bot B, bot C may be dependent on the call bot in that they use the transcript of the call. In an example, bot A has a system prompt triggering bot A to compute a summary of the transcript of the call. In an example, bot B has a system prompt triggering bot B to classify the transcript as requiring an appointment to be booked or not. In an example, bot C has a system prompt triggering bot C to detect text in the transcript to be sent as a short message service message.

However, it is not essential for all the other bots to be dependent on the call bot. In some cases there is more than one call bot; one for dialog with a enterprise manager and another for dialog with a user of services of the enterprise. Where there is more than one call bot the call bots may be independent of one another. In this case the independent bots may operate in parallel whereby one call bot processes transcript from one call whilst another call bot processes transcript from another call. In this way scalability is achieved since the number of bots may be increased in a straightforward manner.

In some cases the bots 128 form a pipeline and operate in a pipeline parallel manner. Operating in a pipeline parallel manner means that transcript from a first call may be processed by one of the bots in the pipeline at the same time as transcript from another call is processed by another one of the bots in the pipeline. Using pipeline parallelism improves efficiency and throughput of the service.

Figure 4:
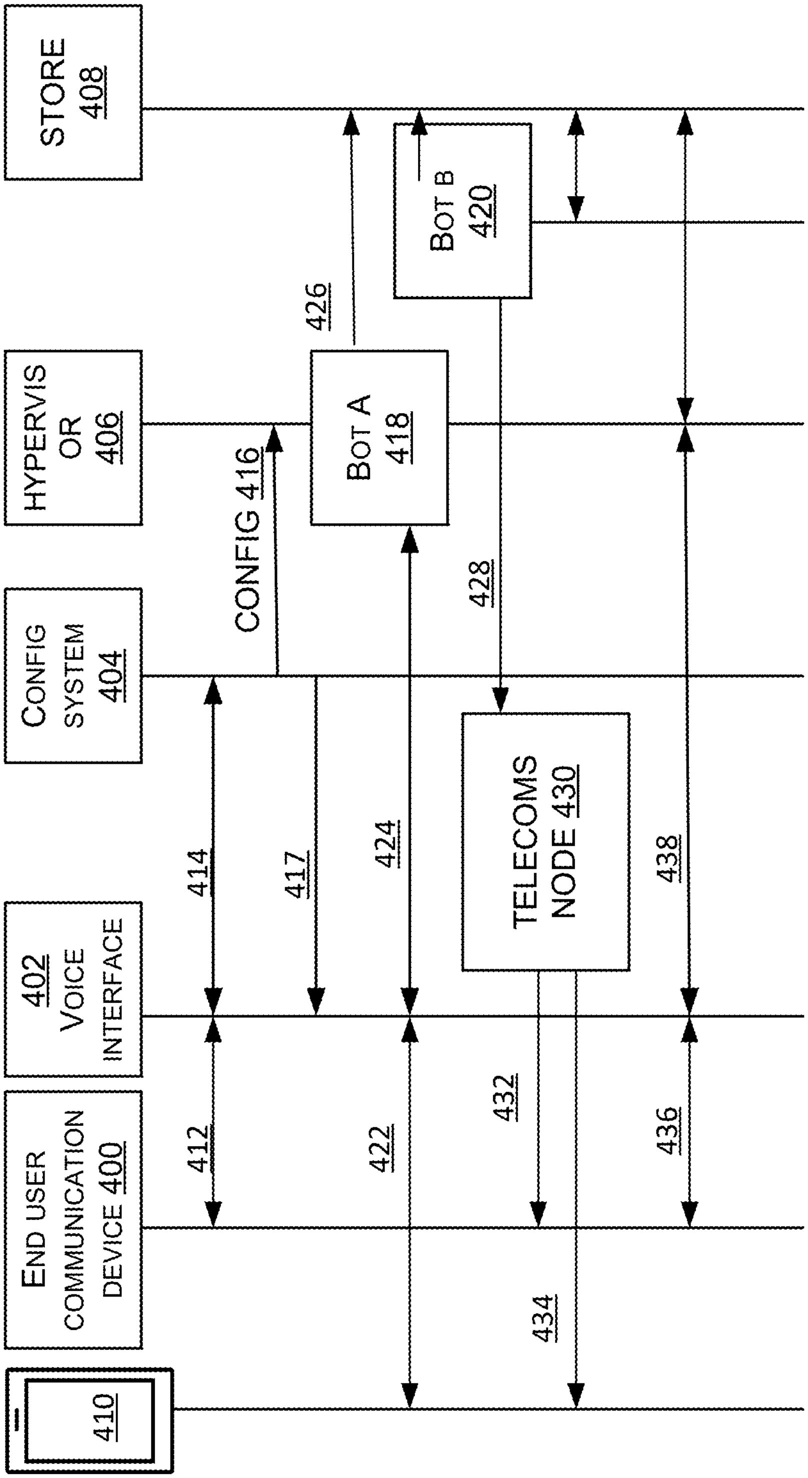
FIG. 4 is a message sequence chart showing configuration of a plurality of bots.

FIG. 4 is a message sequence chart showing configuration of a plurality of bots. An end user communication device 400 is operated by an enterprise manager, or sole trader for example. A customer of the enterprise has a smart phone 410 or other communication device. A voice interface 402 is present as described with reference to FIG. 1. A configuration system 404 is as described with reference to FIG. 1. A hypervisor 406 is shown although this could be an orchestrator in some cases. A store 408 is any database or other store to hold call transcripts and optionally other data.

An enterprise manager or sole trader, such as a plumber, makes a voice or video with voice call 412 to the configuration system 404. Media packets of the call are intercepted by the voice interface 402 and speech signals of the media packets converted to text in some cases. In some cases where the media packets comprise video with voice the voice interface 402 comprises a visual language understanding model such as LlaVa or GPT 4 vision and the voice interface 402 converts the video with voice into text that corresponds to the speech and also explains what is depicted in the video. The output of the voice interface is sent 414 to the configuration system 404.

During the voice call (which may be a voice with video call) the enterprise manager or sole trader specifies a desired configuration of a call center service to be deployed. In an example where the sole trade is a plumber the plumber asks for a receptionist call service with ability to book appointments, send short text messages to the sole trader in case of plumbing emergencies, manage the diary and send call summaries of calls with customers. Thus the desired configuration comprises a type of call center service such as: diary management, appointment booking, receptionist, emergency call handling. In some cases the desired configuration comprises a commercial sector of the call center service such as: childcare, hairdressing, plumbing, heating engineering.

The configuration system comprises a system prompt that is pre configured during manufacturing. The configuration system sends a request comprising the system prompt and the output of the voice interface 414 to a generative model (not shown in FIG. 4). In some cases the request also comprises dynamic content generated by the bot code 204 such as a current time of day, user preferences, homogenized output of the voice interface. Additional system prompts and/or AI models may be used to generate or modify the dynamic content. In some cases the request also comprises data retrieved from data sources by the bot code, such as call transcripts, documents, website data. The bot code may retrieve the data from the data sources by using additional system prompts and/or AI models to generate search or database queries based on the output of the voice interface 414.

In some cases the configuration system sends the request to a plurality of generative models in parallel, in order to reduce latency in receiving a response from one of the generative models, improve responsiveness, and/or reliability.

The configuration system 404 receives a response from the generative model and the response comprises a plurality of system prompts and information about how many bots to instantiate. The configuration system 404 sends configuration instructions 416 to the hypervisor 406 (or orchestrator) triggering the hypervisor 406 or orchestrator to instantiate one or more bots according to the response from the generative model. Because the generative model is given a system prompt and also information about the desired configuration the generative model is able to efficiently and effectively determine how many bots are to be instantiated and what system prompts those bots are to have. The system prompt guides the generative model to determine how many bots are to be instantiated, what system prompts those bots are to have, and whether the bots are independent or dependent on one another. In some cases a given bot has more than one system prompt such as where one system prompt is to be used by bot code of the bot to obtain queries for searching for dynamic content.

In some cases, the response from the generative model comprises a system prompt template, which is combined, by bot code of the configuration system, with dynamic content. The dynamic content is content retrieved by the bot from another source such as a database as explained above or computed by the bot code. In some cases the response from the generative model comprises bot configuration settings (e.g. database connection information or specifications). Alternatively or in addition the bot configuration settings are computed by bot code of the configuration system.

The configuration system 404 sends a message 417 to the voice interface 402 to inform the voice interface of the results of the configuration. Using the configuration results, the voice interface 402 updates routing tables used by the voice interface 402 for routing calls (i.e. routing calls received from end user communication device 400 or smart phone 410 to bots; and routing speech signals generated from text received from bots to end user communication device 400 and smart phone 410).

In the example of FIG. 4 two bots are instantiated, bot A 418 and bot B 420. Bot A is a call bot and receives a call 422, 424 from smart phone 410 such as a customer of the plumber. Media flow of the call passes through voice interface 402 which converts speech to text as explained above. Pre-processing models optionally pre-process the text output from the voice interface. Bot A 418 has at least one system prompt which was generated by the generative model. Bot A also has bot code that receives the transcribed media flow of the call, combines it with the system prompt and sends the combination to the generative model. The bot A may compute or retrieve other dynamic content and include the dynamic content in the combination. In some cases the bot A uses one of its system prompts to obtain a query to query a search engine or other store to obtain the dynamic content. The generative model returns a response which comprises text and which is sent to the voice interface 402 (optionally after having been post-processed by post-processing AI models 208). The voice interface 402 converts the text to speech and inserts it into the call so the smart phone receives it. In this way a human end user of the smart phone 410 experiences a dialog with bot A 418. A record of the call is sent 426 by bot A to store 408 and optionally to end of call model(s) 212.

In an example bot B 420 has a system prompt requesting a transcript of the call to be classified as requiring an appointment to be booked or not and if an appointment is to be booked, the details of the appointment. Bot B has bot code to retrieve a transcript of the call from store 408 and combine it with Bot B's system prompt and optionally with dynamic content. The combination is sent by bot B's bot code to the generative model. A response from the generative model is received at bot B and bot B's code books an appointment if appropriate by sending an instruction to store 408. Bot B's code sends 428 a message to telecoms node 430. Telecoms node 430 is a communications network node capable of sending short message service messages (such as 218 of FIG. 2). In an example telecoms node 420 is a short message service center SMSC network element in a mobile telephone network part of the communications network. Telecoms node 430 receives message 428 and in response sends a short message service message 432 to end user communication device 400 and another short message service message 434 to smart phone 410, informing the details of the booked appointment.

In some examples the system prompt of bot B 420 instructs bot B to return part of the response in a short message service protocol format such as SMPP (short message peer-to-peer) such that message 428 is sent in an appropriate format and does not need to be translated.

An end user of communication device 400 such as a plumber is able to call bot A 418 (see messages 436, 438 in FIG. 4) and obtain details about appointments that have been made. Bot A is able to query store 408 to obtain appointment details, using bot A's bot code.

In the example of FIG. 4 a voice interface is used to convert a voice call into text. However, this is not essential as in some examples multi-modal generative models are used which are capable of taking speech signal input, audio stream input, video stream input, directly instead of or in addition to acting on transcribed audio.

Figure 5:
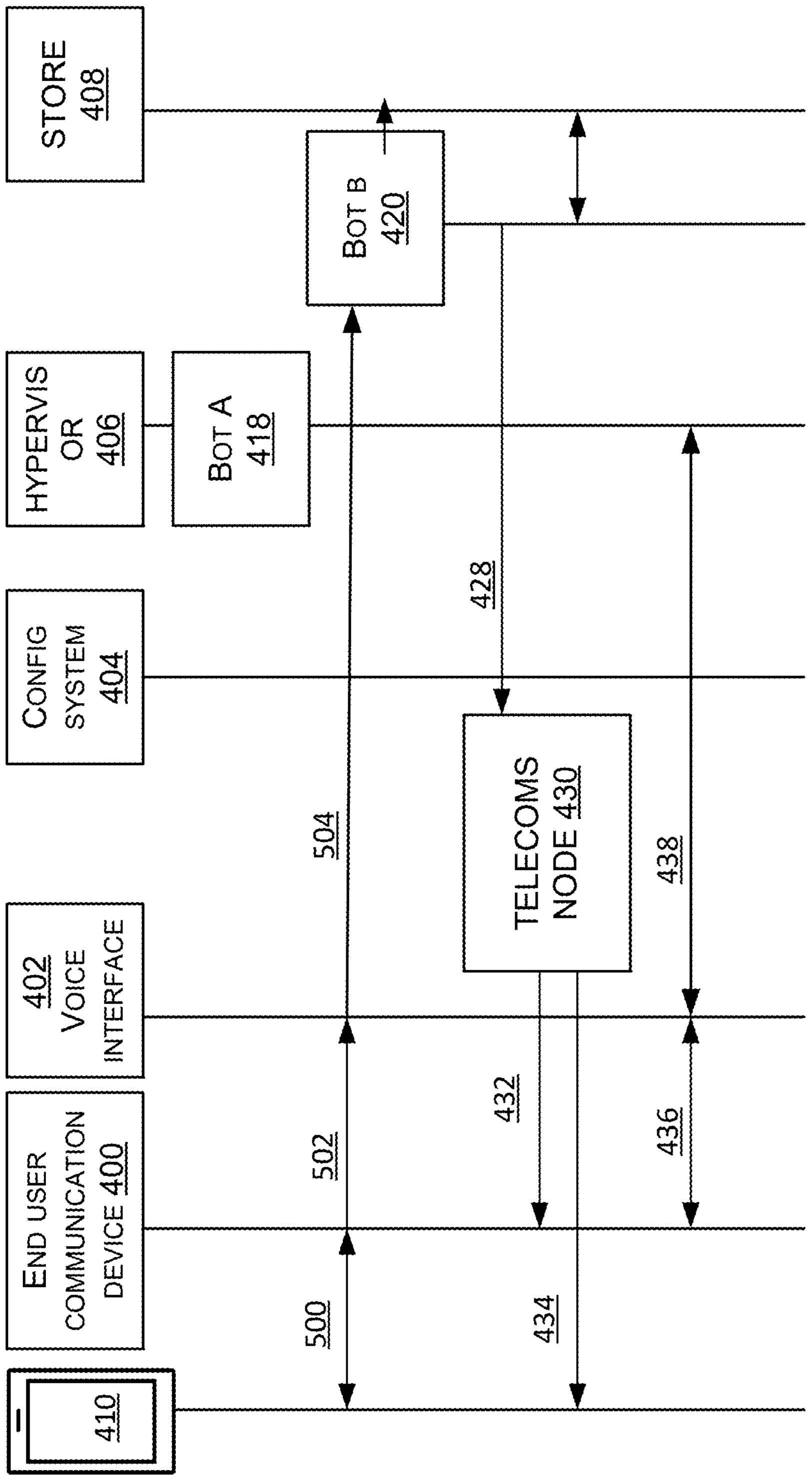
FIG. 5 is a message sequence chart showing observation of a call between two human users.

FIG. 5 is a message sequence chart showing observation of a call between two human users. FIG. 5 has generally the same arrangement as FIG. 4. In FIG. 5 there is a call between smart phone 410 and end user communication device 400 indicated by arrow 500. Media flow of the call is sent to voice interface 402 as indicated by arrow 502 and bot B 420 is able to process the transcribed media flow as indicated by arrow 504 such as to classify the transcribed media flow as indicating an appointment is to be booked or not. If an appointment is to be booked bot B's code sends the appointment details to store 408 and sends message 428 to telecoms node 430 as described with reference to FIG. 4. Messages 432, 434 are as described with reference to FIG. 4 as are flows 436 and 438.

In the example of FIG. 5 a voice interface is used to convert a voice call into text. However, this is not essential as in some examples multi-modal generative models are used which are capable of taking speech signal input, audio stream input, video stream input, directly instead of or in addition to acting on transcribed audio.

Figure 6:
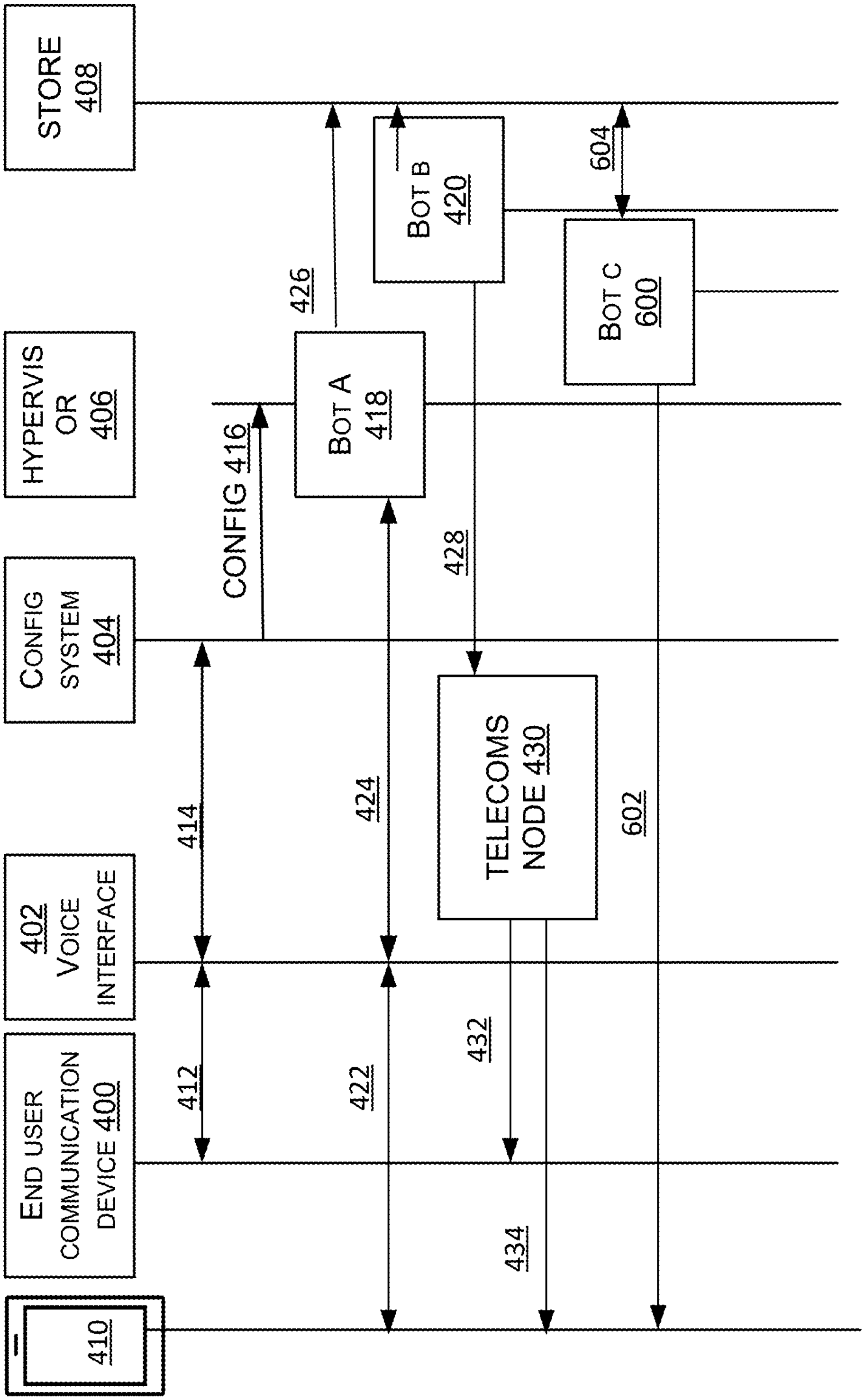
FIG. 6 is a message sequence chart using three instantiated bots.

FIG. 6 is a message sequence chart showing an example where the configuration system triggers instantiation of three bots, Bot A 418, Bot B 420 and Bot C 600. In this example bot A and bot B are as in FIG. 4. Bot C has a system prompt to generate a summary of the call transcript. Bot code of bot C retrieves 604 a transcript of the call from store 408 and sends the transcript and system prompt (and optional dynamic content) to the generative model (not shown for clarity). The generative model returns a response comprising a summary of the transcript. The bot C code sends 602 the summary of the transcript to the smart phone 410 or any other endpoint.

In the example of FIG. 6 a voice interface is used to convert a voice call into text. However, this is not essential as in some examples multi-modal generative models are used which are capable of taking speech signal input, audio stream input, video stream input, directly instead of or in addition to acting on transcribed audio.

In some examples the configuration system is used to adapt already deployed bots. An enterprise manager or sole trader, such as a plumber, makes a voice or video with voice call 412 to the configuration system 404 and speaks to explain the adaptation or change to the already deployed bots that is desired. Media packets of the call are intercepted by the voice interface 402 and speech signals of the media packets converted to text. The output of the voice interface is sent 414 to the configuration system 404.

During the voice call (which may be a voice with video call) the enterprise manager or sole trader requests a change to be made to one or more of the existing instantiated bots. Thus the configuration system receives a request comprising information about a change to be made to one or more of the existing instantiated bots. The configuration system sends a request to a generative model. The request comprises the already generated system prompts (that the configuration system previously received and used to instantiate the existing bots of FIG. 4). The request also comprises the information about a change to be made to one or more of the existing instantiated bots.

In response to the request the configuration system receives a response from the generative model. The response comprises one or more updated versions of the system prompts. The configuration system sends the one or more updated versions of the system prompts to the already instantiated bots to replace one or more of the system prompts of the already instantiated bots.

In the examples described herein a single generative model is referred to. However, it is possible to use more than one generative model; that is, it is not essential to use the same generative model throughout the whole of each method. Different generative models may be used at different points in the processes.

Figure 7:
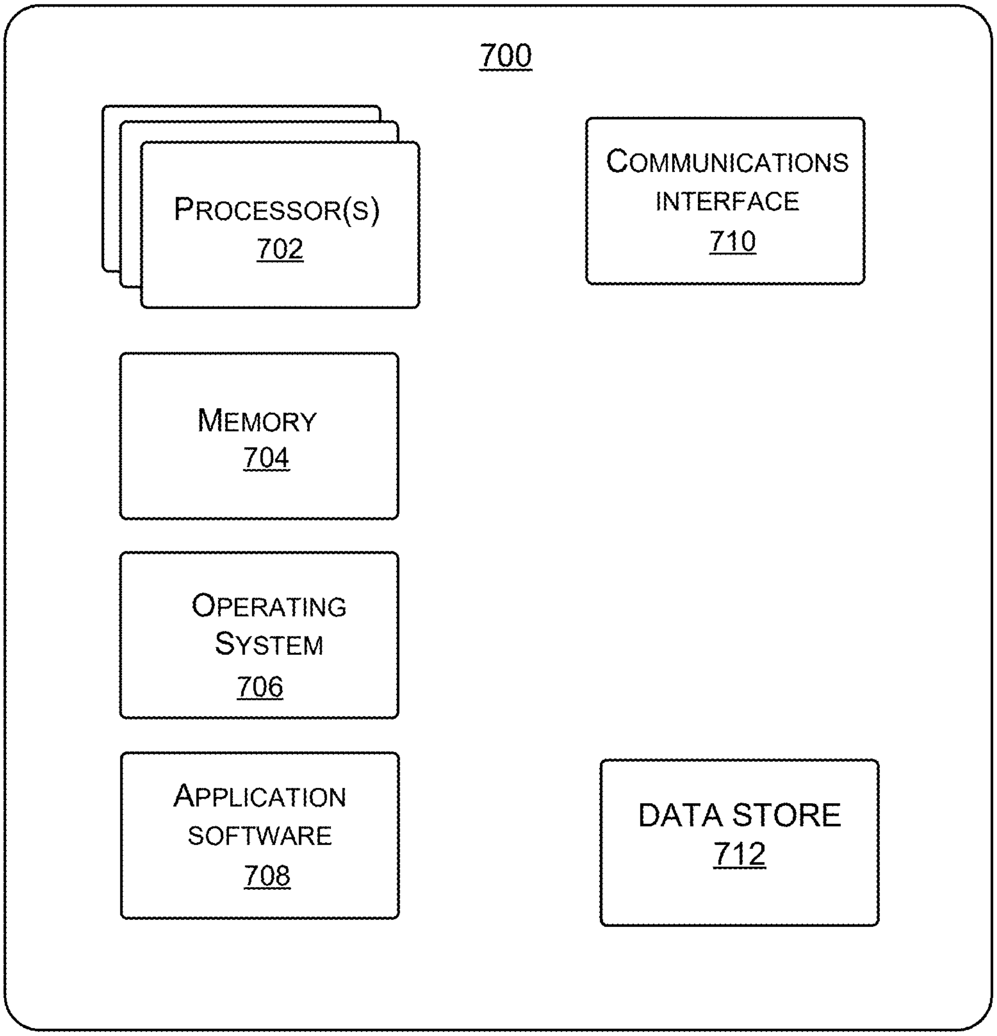
FIG. 7 illustrates an exemplary computing-based device in which a configuration system may be implemented.

FIG. 7 illustrates various components of an exemplary computing-based device 700 which are implemented as any form of a computing and/or electronic device, and in which examples of a configuration system are implemented in some examples. In some examples, the computing-based device 700 is a general-purpose computer that is activated or reconfigured by a computer program stored in the computer. In other examples the computing-based device is specially constructed for the intended purpose.

Computing-based device 700 comprises one or more processors 702 which are microprocessors, controllers or any other suitable type of processors for processing computer executable instructions to control the operation of the device in order to enable an end user to efficiently and easily configure a bespoke call center service, such as by implementing the method of any of FIGS. 4 to 6. The processors 702 may include at least one general-purpose processing device such as a central processing unit, microprocessor, complex instruction set computing (CISC) microprocessor, reduced instruction set computing (RISC) microprocessor, or other general-purpose processing device. In some examples, for example where a system on a chip architecture is used, the processors 702 include one or more special-purpose processing device such as a fixed function block (also referred to as an accelerator) which implements a part of the method of any of FIG. 4 to 6 in hardware (rather than software or firmware). The special-purpose processing device may be configured to execute instructions for performing the operations and methods described herein. Platform software comprising an operating system 706 or any other suitable platform software is provided at the computing-based device to enable application software 708 to be executed on the device. Data store 712 holds system prompts, context, bot code and other data.

The computer executable instructions are provided using any computer-readable media that is accessible by computing based device 700. Computer-readable media includes, for example, computer storage media such as memory 704 and communications media. Computer storage media, such as memory 704, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 704) is shown within the computing-based device 700 it will be appreciated that the storage is, in some examples, distributed or located remotely and accessed via a network or other communication link (e.g. using communication interface 710). The computing-based device is able to communicate with other bots and communications network nodes via communications interface 710.

Alternatively or in addition to the other examples described herein, examples include any combination of the following clauses:

Clause A. A configuration system comprising:

a processor;

a memory storing a system prompt and instructions that, when executed by the processor, perform a method comprising:

receiving, from an endpoint node of a communications network comprising the configuration system, information about a desired bot configuration;

sending a request comprising the system prompt and the received information to a generative model;

receiving a response to the request, the response comprising a plurality of further system prompts for implementing the desired bot configuration;

for each of the plurality of further system prompts, trigger instantiation of a bot at a node of the communications network, the instantiated bot comprising the further system prompt and bot code, the bot code to send the further system prompt and additional information to the generative model, where the additional information is obtained by the instantiated bot from any of: a transcript of a call, a history of previous call transcripts, information obtained from records associated with the endpoint node;

sending configuration to a voice interface, to configure the voice interface such that a telephony call associated with the endpoint node has at least one of the instantiated bots as a participant on the telephony call.

Clause B. The configuration system of clause A wherein receiving the information about the desired bot configuration comprises performing a dialog with the endpoint node using the generative model and recording the dialog as the received information.

Clause C. The configuration system of any preceding clause wherein receiving information from the endpoint node is achieved via a telephony call between the endpoint node and the configuration system.

Clause D. The configuration system of clause C wherein a speech signal of the telephony call is converted to text using a voice interface prior to receiving the information from the endpoint node.

Clause E. The configuration system of any preceding clause wherein each of the instantiated bots comprises bot code to send the further system prompt and additional information to the generative model, where the additional information is obtained by the instantiated bot from any of: a transcript of a call, a history of previous call transcripts, information obtained from records associated with the endpoint node.

Clause F. The configuration system of any preceding clause wherein at least one of the instantiated bots is configured to participate in the telephony call using the generative model and wherein one or more of the other instantiated bots is dependent on the dialog bot.

Clause G. The configuration system of any preceding clause wherein the method comprises sending configuration to the voice interface, to configure the voice interface such that media signals of telephony calls originating from the endpoint node are routed to a first one of the instantiated bots, and media signals of telephony calls made to the endpoint node are routed to a second one of the instantiated bots.

Clause H. The configuration system of any preceding clause wherein the method comprises sending configuration to the voice interface, to configure the voice interface such that media signals of telephony calls between the endpoint node and another node of the communications network are routed to one of the instantiated bots.

Clause I. The configuration system of any preceding clause wherein sending the configuration to the voice interface comprises enabling the voice interface to use the plurality of instantiated bots in a pipeline parallel manner.

Clause J. The configuration system of any preceding clause wherein sending configuration to the voice interface comprises enabling the voice interface to use more than one of the instantiated bots as a participant on the telephony call.

Clause K. The configuration system of any preceding clause wherein triggering instantiation of a bot comprises sending a configuration file to an orchestrator to instantiate a container, or sending instructions to a hypervisor to instantiate a virtual machine.

Clause L. The configuration system of any preceding clause wherein triggering instantiation of a bot comprises specifying the bot code using rules or templates.

Clause M. The configuration system of any preceding clause wherein the bot code is configured to do one or more of: send a system prompt and context to the generative model, obtain context from a call history store, obtain context from a transcript of a call, receive a response from the generative model, send a message to a short message service node of the communications network, send an instruction to update an appointment database, send an instruction to update a database, send a summary of a call to an endpoint node of the communications network.

Clause N. The configuration system of any preceding clause wherein the further system prompts facilitate one or more of: determining an appointment to be booked, determining a call to be placed, determining a short message service message to be sent, creating a summary of a call.

Clause O. A computer implemented method comprising:

receiving, from an endpoint node of a communications network, information about a desired bot configuration;

sending a request comprising the system prompt and the received information to a generative model;

receiving a response to the request, the response comprising a plurality of further system prompts for implementing the desired bot configuration;

for each of the plurality of further system prompts, triggering instantiation of a bot at a node of the communications network, the instantiated bot comprising the further system prompt, sending configuration to a voice interface, to configure the voice interface such that a telephony call associated with the endpoint node has at least one of the instantiated bots as a participant on the telephony call.

Clause P. The computer implemented method of clause O wherein receiving the information about the desired bot configuration comprises performing a dialog with the endpoint node using the generative model and recording a transcript of the dialog as the received information.

Clause Q. The computer implemented method of clause O or clause P comprising: receiving information about a change to be made to the bot configuration;

sending a request comprising the received information and at least one of the further system prompts to a generative model;

receiving a response to the request, the response comprising an updated version of the further system prompt; and replacing the further system prompt by the updated version of the further system prompt.

Clause R. The computer implemented method of any of clauses O to Q wherein each of the instantiated bots comprises bot code to send the further system prompt and additional information to the generative model, where the additional information is obtained by the instantiated bot from any of: a transcript of a call, a history of previous call transcripts, information obtained from records associated with the endpoint node.

Clause S. A communications network comprising a configuration system comprising:

a processor;

a memory storing a system prompt and instructions that, when executed by the processor, perform a method comprising:

receiving, from an endpoint node of a communications network comprising the configuration system, information about a desired bot configuration;

sending a request comprising the system prompt and the received information to a generative model;

receiving a response to the request, the response comprising a plurality of further system prompts for implementing the desired bot configuration;

for each of the plurality of further system prompts, trigger instantiation of a bot at a node of the communications network, the instantiated bot comprising the further system prompt and bot code, sending configuration to a voice interface, to configure the voice interface such that a telephony call associated with the endpoint node has at least one of the instantiated bots as a participant on the telephony call.

Clause T. The communications network of clause S comprising the plurality of instantiated bots.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The configurations described above enable various methods for providing transcripts of calls to a computer system. The methods herein, which involve the observation of people in their daily lives, may and should be enacted with utmost respect for personal privacy. Accordingly, the methods presented herein are fully compatible with opt-in participation of the persons being observed. In examples where personal data is collected on a local system and transmitted to a remote system for processing, that data can be anonymized in a known manner. In other examples, personal data may be confined to a local system, and only non-personal, summary data transmitted to a remote system.

What is claimed is:

1. A configuration system comprising:
- a processor;
- a memory storing a system prompt and instructions that, when executed by the processor, cause the system to perform operations comprising:
- receiving, from an endpoint node of a communications network comprising the configuration system, information about a desired bot configuration;
- sending a request comprising the system prompt and the received information to a generative model;
- receiving a response to the request, the response comprising a plurality of further system prompts for implementing the desired bot configuration;
- for each of the plurality of further system prompts, triggering instantiation of a bot at a node of the communications network, the instantiated bot comprising one of the further system prompts and bot code, the bot code operable to send the one further system prompt and additional information to the generative model, where the additional information is obtained by the instantiated bot from any of: a transcript of a call, a history of previous call transcripts, or information obtained from records associated with the endpoint node; and
- sending a configuration to a voice interface to configure the voice interface such that a telephony call associated with the endpoint node has at least one of the instantiated bots as a participant on the telephony call.

2. The configuration system of claim 1, wherein receiving the information about the desired bot configuration comprises performing a dialog with the endpoint node using the generative model and recording the dialog as the received information.

3. The configuration system of claim 1, wherein receiving information from the endpoint node is achieved via another telephony call between the endpoint node and the configuration system.

4. The configuration system of claim 3, wherein a speech signal of the another telephony call is converted to text using a voice interface prior to receiving the information from the endpoint node.

5. The configuration system of claim 1, further comprising instructions that, when executed by the processor, cause the system to perform operations comprising:
- receiving additional information about a change to be made to the bot configuration;
- sending a request comprising the received additional information and at least one of the further system prompts to a generative model;
- receiving a response to the request, the response comprising an updated version of the at least one further system prompt; and
- replacing the at least one further system prompt by the updated version of the at least one further system prompt.

6. The configuration system of claim 1, wherein at least one of the instantiated bots is configured to participate in the telephony call using the generative model and wherein one or more other instantiated bots is dependent on the instantiated bot participating in the telephony call.

7. The configuration system of claim 1, wherein the voice interface is further configured such that media signals of telephony calls originating from the endpoint node are routed to a first one of the instantiated bots, and media signals of telephony calls made to the endpoint node are routed to a second one of the instantiated bots.

8. The configuration system of claim 1, wherein the voice interface is further configured such that media signals of telephony calls between the endpoint node and another node of the communications network are routed to one of the instantiated bots.

9. The configuration system of claim 1, wherein the voice interface is configured to use the instantiated bots in a pipeline parallel manner.

10. The configuration system of claim 1, wherein the voice interface is enabled to use more than one of the instantiated bots as a participant on the telephony call.

11. The configuration system of claim 1, wherein triggering instantiation of a bot comprises one of sending a configuration file to an orchestrator to instantiate a container, or sending instructions to a hypervisor to instantiate a virtual machine.

12. The configuration system of claim 1, wherein triggering instantiation of a bot comprises specifying the bot code using rules or templates.

13. The configuration system of claim 1, wherein the bot code is configured to cause one or more of: send a system prompt and context to the generative model, obtain context from a call history store, obtain context from a transcript of a call, receive a response from the generative model, send a message to a short message service node of the communications network, send an instruction to update an appointment database, send an instruction to update a database, or send a summary of a call to an endpoint node of the communications network.

14. The configuration system of claim 1, wherein the further system prompts are operable to facilitate one or more of: determining an appointment to be booked, determining a call to be placed, determining a short message service message to be sent, or creating a summary of a call.

15. A computer implemented method comprising:

receiving, from an endpoint node of a communications network, information about a desired bot configuration;

sending a request comprising a system prompt and the received information to a generative model;

receiving a response to the request, the response comprising a plurality of further system prompts for implementing the desired bot configuration;

for each of the plurality of further system prompts, triggering instantiation of a bot at a node of the communications network, the instantiated bot comprising one of the further system prompts and bot code, the bot code operable to send the one further system prompt and additional information to the generative model, where the additional information is obtained by the instantiated bot from any of: a transcript of a call, a history of previous call transcripts, or information obtained from records associated with the endpoint node; and sending a configuration to a voice interface to configure the voice interface such that a telephony call associated with the endpoint node has at least one of the instantiated bots as a participant on the telephony call.

16. The computer implemented method of claim 15, wherein receiving the information about the desired bot configuration comprises performing a dialog with the endpoint node using the generative model and recording the dialog as the received information.

17. The computer implemented method of claim 15, further comprising:

receiving additional information about a change to be made to the bot configuration;

sending a request comprising the received additional information and at least one of the further system prompts to a generative model;

receiving a response to the request, the response comprising an updated version of the at least one further system prompt; and replacing the at least one further system prompt by the updated version of the at least one further system prompt.

18. The computer implemented method of claim 15, wherein each of the instantiated bots comprises bot code to send the further system prompts and additional information to the generative model, where the additional information is obtained by the instantiated bot from any of: a transcript of a call, a history of previous call transcripts, or information obtained from records associated with the endpoint node.

19. A communications network comprising a configuration system comprising:

a processor;

a memory storing a system prompt and instructions that, when executed by the processor, cause the configuration system to perform operations comprising:

receiving, from an endpoint node of a communications network comprising the configuration system, information about a desired bot configuration;

sending a request comprising the system prompt and the received information to a generative model;

receiving a response to the request, the response comprising a plurality of further system prompts for implementing the desired bot configuration;

for each of the plurality of further system prompts, trigger instantiation of a bot at a node of the communications network, the instantiated bot comprising one of the further system prompts and bot code; and sending a configuration to a voice interface to configure the voice interface such that a telephony call associated with the endpoint node has at least one of the instantiated bots as a participant on the telephony call.

20. The communications network of claim 19, further comprising the instantiated bots.

* * * * *